(12) United States Patent
Kunimitsu et al.

(10) Patent No.: US 11,962,172 B2
(45) Date of Patent: Apr. 16, 2024

(54) POWER SUPPLY SYSTEM AND MANAGEMENT DEVICE

(71) Applicant: SANYO Electric Co., Ltd., Osaka (JP)

(72) Inventors: Tomonori Kunimitsu, Hyogo (JP); Masato Nakayama, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 606 days.

(21) Appl. No.: 17/261,103

(22) PCT Filed: Jul. 23, 2019

(86) PCT No.: PCT/JP2019/028884
§ 371 (c)(1),
(2) Date: Jan. 18, 2021

(87) PCT Pub. No.: WO2020/022344
PCT Pub. Date: Jan. 30, 2020

(65) Prior Publication Data
US 2021/0320505 A1    Oct. 14, 2021

(30) Foreign Application Priority Data

Jul. 25, 2018  (JP) ................................ 2018-139283

(51) Int. Cl.
*H02J 7/00* (2006.01)
*H01M 10/48* (2006.01)

(52) U.S. Cl.
CPC ........... *H02J 7/0019* (2013.01); *H01M 10/48* (2013.01); *H02J 7/0047* (2013.01); *H02J 7/0063* (2013.01);
(Continued)

(58) Field of Classification Search
CPC ...... H02J 7/0016; H02J 7/0014; H02J 7/0048; H02J 7/0019; H02J 7/0013; H02J 7/345;
(Continued)

(56) References Cited

U.S. PATENT DOCUMENTS

| | | | | |
|---|---|---|---|---|
| 8,896,315 B1* | 11/2014 | Davies | ................. | H02J 7/0016 320/120 |
| 2013/0049698 A1* | 2/2013 | Jung | .................... | H02J 7/0016 320/134 |
| 2018/0151919 A1* | 5/2018 | Sasaki | ................ | H01M 10/425 |

FOREIGN PATENT DOCUMENTS

JP         2015-061340         3/2015

OTHER PUBLICATIONS

International Search Report of PCT application No. PCT/JP2019/028884 dated Sep. 3, 2019.

* cited by examiner

*Primary Examiner* — Binh C Tat
(74) *Attorney, Agent, or Firm* — WHDA, LLP (57) ABSTRACT

In execution of an equalization process between a plurality of cells connected in series, power supply system is provided. In power supply system, control circuit performs active balancing between a plurality of cells included in each of a plurality of series cell groups, using a plurality of active cell balancing circuits, and performs passive balancing between the plurality of series cell groups. Voltage detection circuit connected to a series cell group being undergoing the passive balancing and consuming power is supplied with power from first power supply circuit. Voltage detection circuit connected to series cell group being undergoing active cell balancing by active cell balancing circuit is supplied with power from second power supply circuit higher in efficiency than first power supply circuit.

6 Claims, 4 Drawing Sheets

(52) U.S. Cl.
CPC ..... *H02J 7/007182* (2020.01); *H02J 2207/10* (2020.01)

(58) Field of Classification Search
CPC .. H02J 1/102; H02J 2310/44; H02J 7/007182; H02J 7/35; H02J 1/106; H02J 7/0024; H02J 7/0025; H02J 7/00; H02J 7/007192; H02J 2300/30; H02J 2310/48; H02J 3/00; H02J 7/00036; H02J 7/0018; H02J 7/00308; H02J 2207/20; H02J 7/0063; H02J 7/342; H02J 1/001; H02J 2300/24; H02J 3/381; H02J 7/00047; H02J 7/0029; H02J 7/00304; H02J 1/10; H02J 7/005; H02J 7/34; H02J 50/12; H02J 7/00712; H02J 7/00714; H02J 7/007194; H02J 7/04; H02J 7/00302; H02J 7/0031; H02J 7/0068; H02J 7/0071; H02J 7/1423; H02J 9/062; H02J 2310/18; H02J 3/14; H02J 3/388; H02J 3/40; H02J 4/00; H02J 50/10; H02J 50/40; H02J 50/80; H02J 50/90; H02J 7/00306; H02J 7/00309; H02J 7/0032; H02J 7/0045; H02J 7/0047; H02J 7/02; H02J 7/32; H02J 2207/10; H02J 2300/28; H02J 3/32; H02J 7/0042; H02J 7/0049; H02J 7/0069; H02J 7/14; H02J 9/002; H02J 2203/20; H02J 2310/40; H02J 7/00032; H02J 7/00034; H01M 50/204; H01M 16/003; H01M 10/488; H01M 8/04753; H01M 2010/4271; H01M 10/425; H01M 50/213; H01M 10/4257; H01M 10/647; H01M 8/04955; H01M 8/16; H01M 8/18

USPC .................................................. 320/118–125
See application file for complete search history.

| | Normal state | During active balancing | During passive balancing |
|---|---|---|---|
| Voltage detection circuit | Second power supply circuit | Second power supply circuit | First power supply circuit |
| Active cell balancing circuit | | Second power supply circuit | |

POWER SUPPLY SYSTEM AND MANAGEMENT DEVICE

CROSS-REFERENCE TO RELATED APPLICATIONS

This application is a U.S. national stage application of the PCT International Application No. PCT/JP2019/028884 filed on Jul. 23, 2019, which claims the benefit of foreign priority of Japanese patent application No. 2018-139283, filed on Jul. 25, 2018, the contents all of which are incorporated herein by reference.

TECHNICAL FIELD

The present invention relates to a power supply system including a plurality of cells connected in series and to a management device.

BACKGROUND ART

Hybrid vehicles (HV), plug-in hybrid vehicles (PHV), and electric vehicles (EV) have become widespread in recent years. These vehicles carry secondary cells working as key devices. In-vehicle secondary cells in wide use include nickel-hydrogen cells and lithium-ion cells. It is expected that in future, spreading use of lithium-ion cells with high energy density will accelerate.

The lithium-ion cell has a service voltage range and a service-inhibited voltage range that are close to each other, and therefore requires voltage control stricter than voltage control over other types of cells. Generally, in a lithium-ion cell system, an equalization process of equalizing capacities of a plurality of cells connected in series is executed in view of the need for maintaining power efficiency and ensuring safety (see, e.g., PTL 1).

Among some methods of executing the equalization process, a passive method is the most popular one. According to the passive method, a discharge resistance is connected to each of a plurality of cells connected in series, and to match voltages of other cells to a voltage of a cell lowest in voltage, the other cells are caused to discharge.

Another method of executing the equalization process is an active method. The active method requires a charge circuit, which, out of a plurality of cells connected in series, charges other cells in order to match voltages of the other cells to a voltage of a cell highest in voltage.

CITATION LIST

Patent Literature

PTL 1: Unexamined Japanese Patent Publication No. 2015-61340

SUMMARY OF THE INVENTION

The passive method requires that part of energy accumulated in cells be abandoned for equalization, which leads to a drop in power efficiency. The passive method poses another problem that the discharge resistance generates heat when allowing a current to flow through. The active method, on the other hand, requires the charge circuit for charging each cell, which leads to a complicated component structure and higher cost.

The present invention has been conceived in view of the above circumstances, and it is therefore an object of the present invention to provide a technique of improving power efficiency while suppressing complication of a component structure in execution of an equalization process between a plurality of cells connected in series.

In order to solve the above problems, a power supply system according to an aspect of the present invention includes: a plurality of series cell groups connected in series, the series cell groups each including a plurality of cells connected in series; a plurality of voltage detection circuits connected respectively to the plurality of series cell groups, the voltage detection circuits each detecting a voltage of each of the plurality of cells included in a subject series cell group; a plurality of first power supply circuits connected respectively to the plurality of series cell groups, each of the first power supply circuits reducing a voltage across both ends of the subject series cell group and supplying power to a subject voltage detection circuit; a plurality of active cell balancing circuits connected respectively to the plurality of series cell groups, the active cell balancing circuits each being configured to selectively charge any one of the plurality of cells included in the subject series cell group, using a voltage across both ends of the subject series cell group; a plurality of second power supply circuits connected respectively to the plurality of series cell groups, each of the second power supply circuits reducing a voltage across both ends of the subject series cell group and supplying power to a subject active cell balancing circuit; and a control circuit that acquires each of voltage values of cells from the plurality of voltage detection circuits, the control circuit performing active balancing between the plurality of cells included in each of the plurality of series cell groups, using the plurality of active cell balancing circuits, and performing passive balancing between the plurality of series cell groups. The second power supply circuit is a power supply circuit higher in efficiency than the first power supply circuit, and is capable of supplying power also to each of the voltage detection circuits. A voltage detection circuit connected to a series cell group being undergoing the passive balancing and consuming power is supplied with power from the first power supply circuit. A voltage detection circuit connected to a series cell group being undergoing active cell balancing by the active cell balancing circuit is supplied with power from the second power supply circuit.

Any given combination of the above constituent elements and modifications of the features of the present invention in methods, devices, systems, and the like are still effective as other aspects of the present invention.

According to the present invention, in execution of an equalization process between a plurality of cells connected in series, power efficiency can be improved as complication of a component structure is suppressed.

DESCRIPTION OF EMBODIMENT

Figure 1:
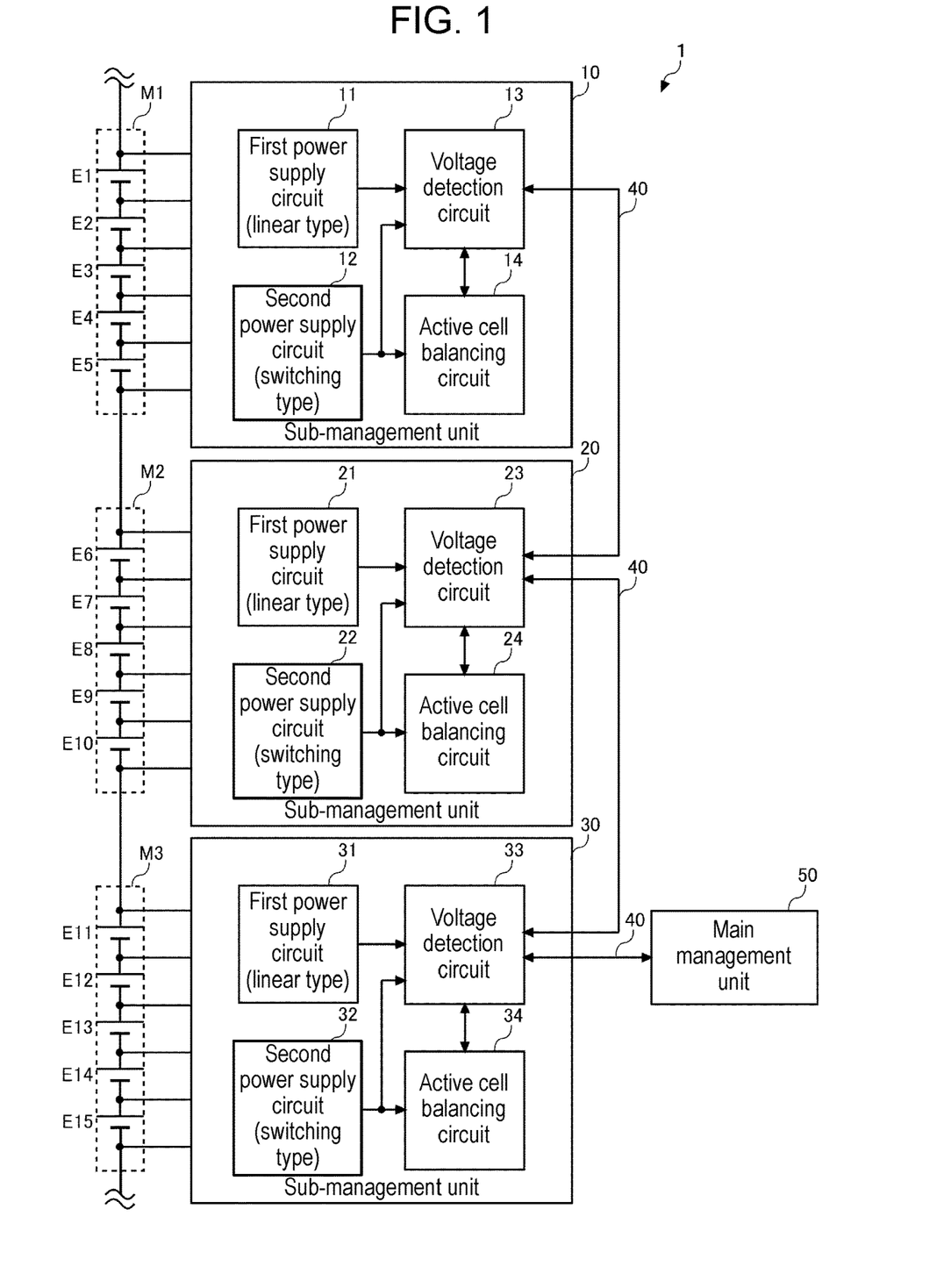
FIG. 1 is a diagram showing a configuration of a power supply system according to an exemplary embodiment of the present invention.

FIG. 1 is a diagram showing a configuration of power supply system 1 according to an exemplary embodiment of the present invention. Power supply system 1 includes a plurality of power storage modules (first power storage module M1 to third power storage module M3 shown in FIG. 1), a plurality of sub-management units (first sub-management unit 10 to third sub-management unit 30 shown in FIG. 1), and main management unit 50.

First power storage module M1 is formed by connecting a plurality of cells (first sell E1 to fifth cell E5 shown in FIG. 1) in series, second power storage module M2 is formed by connecting a plurality of cells (sixth sell E6 to tenth cell E10 shown in FIG. 1) in series, and third power storage module M3 is formed by connecting a plurality of cells (11th sell E 11 to 15th cell E15 shown in FIG. 1) in series. In FIG. 1, configurations of power storage modules M1 to M3 are depicted in their simplified forms to make description simpler. In many cases, power storage modules M1 to M3 have their actual configurations in which cells more than those depicted in FIG. 1 are connected in series, according to the need of voltages in power supply system 1.

Each cell may be provided as a lithium-ion battery cell, a nickel-hydrogen battery cell, a lead battery cell, an electric double-layer capacitor cell, a lithium-ion capacitor cell, or the like. Hereinafter, examples described in this specification are assumed to be examples in which lithium-ion battery cells (nominal voltage ranging from 3.6 V to 3.7 V) are used.

First power storage module M1 and first sub-management unit 10 make up one power storage block. First sub-management unit 10 includes first power supply circuit 11, second power supply circuit 12, voltage detection circuit 13, and active cell balancing circuit 14, which are mounted on one circuit board.

Likewise, second power storage module M2 and second sub-management unit 20 make up one power storage block, and second sub-management unit 20 includes first power supply circuit 21, second power supply circuit 22, voltage detection circuit 23, and active cell balancing circuit 24. Likewise, third power storage module M3 and third sub-management unit 30 make up one power storage block, and third sub-management unit 30 includes first power supply circuit 31, second power supply circuit 32, voltage detection circuit 33, and active cell balancing circuit 34.

First sub-management unit 10 to third sub-management unit 30 and main management unit 50 are interconnected by a daisy chain connection method through communication line 40. The daisy chain connection method refers to a connection method by which a plurality of devices are tied one to the next. It is a connection method for transferring a signal from one device to another device adjacent to each other. A form of connection of first sub-management unit 10 to third sub-management unit 30 and main management unit 50 is not limited to daisy chain connection, but may be selected otherwise as ring connection, bus connection, star connection, or the like. In this specification, first sub-management unit 10 to third sub-management unit 30 and main management unit 50 are collectively referred to as management device.

First sub-management unit 10 to third sub-management unit 30 are connected to main management unit 50 via an insulating circuit. As the insulating circuit, a DC-cutoff capacitor, a transformer, a photocoupler, and the like can be used. Voltage detection circuits 13, 23, 33 of first sub-management unit 10 to third sub-management unit 30 are required to detect voltages of a plurality of cells connected in series, and therefore need to be circuits operating at a high voltage. Main management unit 50, on the other hand, usually operates with power supplied from a 12V lead battery. This gives rise to a voltage difference between first sub-management unit 10 to third sub-management unit 30 and main management unit 50, and to absorb this voltage difference, first sub-management unit 10 to third sub-management unit 30 must be insulated from main management unit 50.

For communication between first sub-management unit 10 to third sub-management unit 30 and main management unit 50, a given serial communication system can be employed. For example, a communication system using a serial peripheral interface (SPI), an inter-integrated circuit (I2C), or a universal asynchronous receiver/transmitter (DART) can be employed. A manufacturer's original communication system may also be employed.

In first sub-management unit 10, first power supply circuit 11 is connected to both ends of first power storage module M1, reduces a voltage across both ends of first power storage module M1, and supplies the reduced voltage as a power supply voltage, to voltage detection circuit 13. Second power supply circuit 12 is connected to both ends of first power storage module M1, reduces a voltage across both ends of first power storage module M1, and supplies the reduced voltage as a power supply voltage, to active cell balancing circuit 14.

Second power supply circuit 12 is provided with a power supply circuit higher in efficiency than first power supply circuit 11. For example, first power supply circuit 11 is composed of a linear DC/DC (Direct current to direct current) converter, and second power supply circuit 12 is composed of a switching-type stepdown DC/DC converter. A typical linear DC/DC converter is a linear regulator. Among various types of linear regulators, a low-drop-out (LDO) regulator is the most popular one.

The linear regulator is a regulator that to keep an output voltage equal to a target voltage, causes a variable resistance (e.g., on-resistance of a power metal oxide silicon field effect transistor (MOSFET)) interposed between an input end and an output end to consume power, thereby outputting an intended stable voltage. In the linear regulator, energy based on a difference between an input voltage and an output voltage is turned into heat by the variable resistance. A larger difference between the input voltage and the output voltage, therefore, results in a larger amount of heat generation, thus leading to a drop in conversion efficiency.

The switching-type stepdown DC/DC converter is a DC/DC converter that to keep an output voltage equal to a target voltage, controls a duty ratio of a switching element, thereby outputting an intended stable voltage. As the switching-type stepdown DC/DC converter, a stepdown chopper, an insulating fly-back DC/DC converter, an insulating forward DC/DC converter, an insulating push-pull DC/DC converter, or the like can be used.

In the switching-type step down DC/DC converter, energy is accumulated at an inductor or a capacitance in a period in which input power is not supplied to a load, and the accumulated energy is supplied to the load later on. The switching-type stepdown DC/DC converter thus allows highly efficient power conversion. If, in an ideal condition, switching loss, diode loss, and the like can be reduced almost to 0%, conversion efficiency can be brought indefinitely closer to 100%.

In this manner, the switching-type stepdown DC/DC converter is higher in efficiency than the linear regulator. When a difference between an input voltage and an output voltage is large, in particular, a difference in conversion efficiency between the stepdown DC/DC converter and the linear regulator becomes notable. However, the linear regulator has a simple circuit configuration and requires less cost. The switching-type stepdown DC/DC converter, on the other hand, has a relatively complicated circuit configuration and requires higher cost, in comparison with the linear regulator.

In general, voltage detection circuit 13 is composed of an application-specific integrated circuit (ASIC) in many cases. As a power supply to the ASIC, in general, a linear regulator (LDO) is used in many cases. In many cases, the linear regulator is built in an ASIC chip. Because an IC consumes a little amount of power, an inexpensive, small linear regulator is often used. The linear regulator may be disposed outside the ASIC chip.

Active cell balancing circuit 14 equalizes voltages and capacities of the plurality of cells E1 to E5 included in first power storage module M1, by an active cell balancing method. Using a voltage across both ends of first power storage module M1, active cell balancing circuit 14 can selectively charge any one of the plurality of cells E1 to E5 included in first power storage module M1.

Active cell balancing circuit 14 may be integrated into the above ASIC chip or may be packaged in an IC chip different from the ASIC chip. When voltage detection circuit 13 is provided with a general-purpose ASIC chip, active cell balancing circuit 14 is packaged in an IC chip different from the ASIC chip. It should be noted that some circuit elements making up active cell balancing circuit 14 may be connected to the outside the IC chip package.

Active cell balancing circuit 14 allows a charge current lager than a current flowing in the above ASIC to flow through. Because of this fact, not the linear regulator but the switching-type stepdown DC/DC converter, which generates less heat and offers high conversion efficiency, is used as a power supply circuit to active cell balancing circuit 14. When active cell balancing circuit 14 is packaged in an IC chip different from the ASIC chip, the switching-type stepdown DC/DC converter may be incorporated in the IC chip or may be disposed outside the IC chip.

When active cell balancing circuit 14 is integrated into the ASIC chip, the linear regulator and the switching-type stepdown DC/DC converter may be incorporated in the ASIC chip or may be disposed outside the ASIC chip. In this manner, first power supply circuit 11, second power supply circuit 12, voltage detection circuit 13, and active cell balancing circuit 14 can be mounted by various packaging methods.

Figure 2:
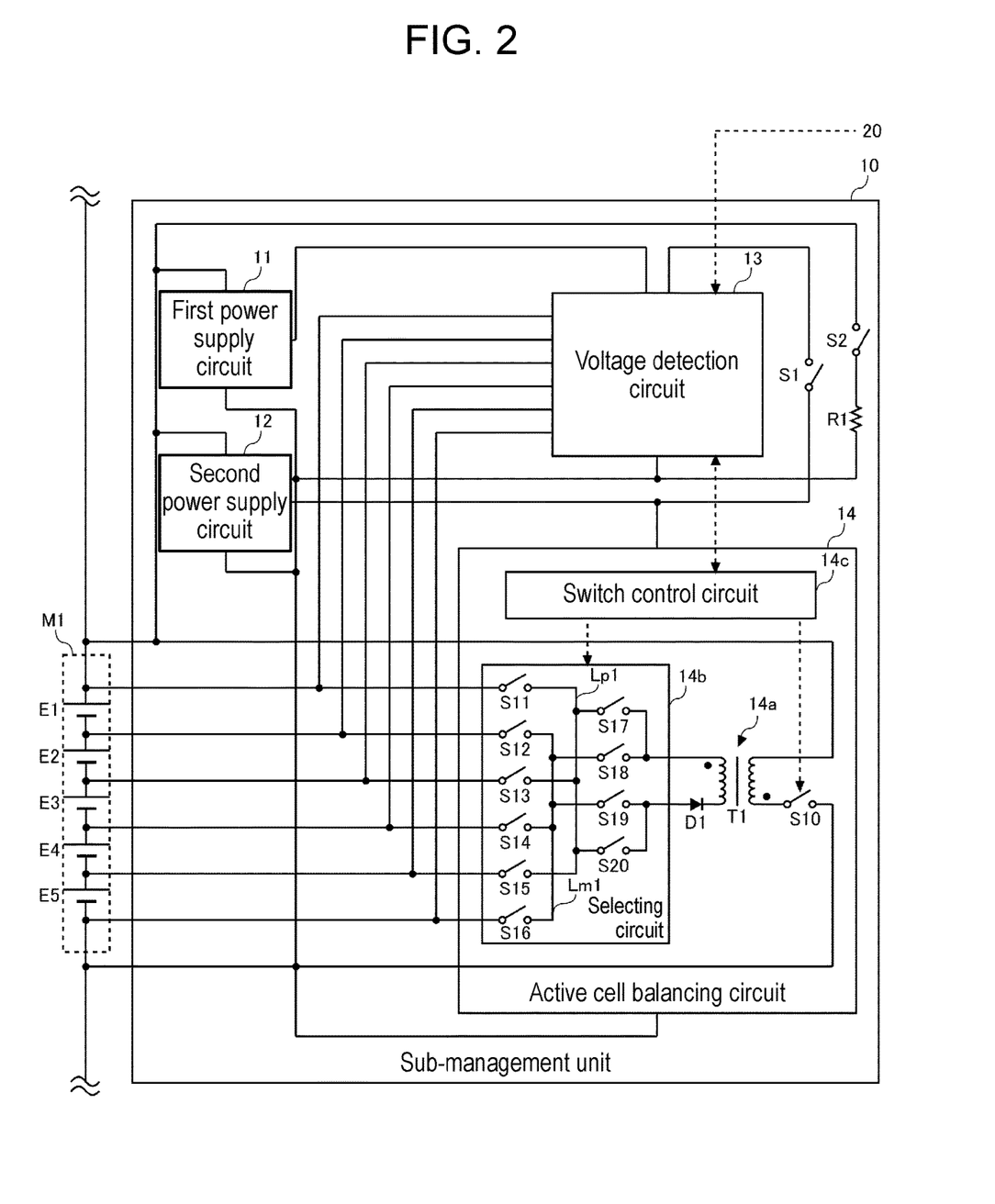
FIG. 2 is a diagram showing a first configuration example of a first sub-management unit.

FIG. 2 is a diagram showing a first configuration example of first sub-management unit 10. Voltage detection circuit 13 is connected to respective nodes of the plurality of cells E1 to E5 connected in series, through a plurality of voltage lines, and detects a voltage between each pair of adjacent voltage lines, thereby detecting a voltage of each of cells E1 to E5. Voltage detection circuit 13 includes a multiplexer, an A/D converter, and a communication circuit, which are not depicted.

The multiplexer outputs respective voltage values of the plurality of cells E1 to E5 to the A/D converter in given order. The A/D converter converts incoming analog signals from the multiplexer, into digital values, and outputs the digital values to the communication circuit. The communication circuit transmits the voltage values of the plurality of cells E1 to E5 to main management unit 50 via communication line 40. The communication circuit may be disposed separately outside voltage detection circuit 13 (ASIC).

Active cell balancing circuit 14 includes DC/DC converter 14*a*, cell selecting circuit 14*b*, and switch control circuit 14*c*. Cell selecting circuit 14*b* has a plurality of switches S11 to S20.

DC/DC converter 14*a* reduces a voltage across both ends of first power storage module M1 to charge one of the plurality of cells E1 to E5. FIG. 2 shows an example in which DC/DC converter 14*a* is provided with an insulating fly-back DC/DC converter. The insulating fly-back DC/DC converter has transformer T1, switch S10, and diode D1. In the insulating fly-back DC/DC converter, a primary coil and a secondary coil of transformer T1 are set reverse in polarity to each other.

DC/DC converter 14*a* is not limited to the insulating fly-back DC/DC converter, but may be provided with a DC/DC converter of any configuration on the condition that it is capable of reducing a voltage across both ends of first power storage module M1 and outputting the reduced voltage. As such a DC/DC converter, not only the above insulating fly-back DC/DC converter but also an insulating forward DC/DC converter is known.

Both ends of the primary coil of transformer T1 are connected respectively to both ends of first power storage module M1. Switch S10 is interposed between one end of the primary coil and one end of power storage module M1. To one end of the secondary coil of transformer T1, a rectifying diode D1 is connected.

The second coil of transformer T1 is connected to both ends of one of the plurality of cells E1 to E5 via a plurality of switches S11 to S20. To the nodes of the plurality of cells E1 to E5, the voltage lines are connected respectively. A first voltage line, a third voltage line, and a fifth voltage line are combined together into a positive electrode wire Lp1, while a second voltage line, a fourth voltage line, and a sixth voltage line are combined together into a negative electrode wire Lm1. The first voltage line to the sixth voltage line are provided respectively with switches S11 to S16.

A current output side terminal of the secondary coil of transformer T1 is connected to positive electrode wire Lp1 via switch S17 and is connected to negative electrode wire Lm1 via switch S18. A current input side terminal of the secondary coil of transformer T1 is connected to positive electrode wire Lp1 via switch S20 and is connected to negative electrode wire Lm1 via switch S19.

Switch control circuit 14*c* controls switching on and off of switch S10 of the insulating fly-back DC/DC converter and that of the plurality of switches S11 to S20 of cell selecting circuit 14*b*, based on a control signal for an equalization process, the control signal being transmitted from main management unit 50 to switch control circuit 14*c* via communication line 40 and voltage detection circuit 13.

FIG. 2 shows an example in which out of voltage detection circuit 13 and active cell balancing circuit 14, only voltage detection circuit 13 has a communication function. In a case where active cell balancing circuit 14 also has the communication function, active cell balancing circuit 14 can receive the control signal for the equalization process that is input directly to active cell balancing circuit 14 without being relayed by voltage detection circuit 13.

Switch control circuit 14*c* controls two switches, i.e., switch S17 or S18 and switch S19 or S20 to put them into an on-state, the two switches being provided on two voltage lines connected to nodes at both ends of a cell to be charged. For example, to charge cell E1, switch control circuit 14c controls switch S11, switch S12, switch S17, and switch S19 to put them into the on-state. To charge cell E2, switch control circuit 14c controls switch S12, switch S13, switch S18, and switch S20 to put them into the on-state. An on-time for each cell is determined in accordance with a charge time for each cell, the charge time being included in the incoming control signal for the equalization process from main management unit 50.

Switch control circuit 14c may be configured to control switch S10 by pulse width modulation (PWM). It should be noted that depending on a circuit configuration, a potential at a ground node of switch control circuit 14c may be different from a potential at a ground node of a circuit including switch S10. In such a circuit configuration, a control signal from switch control circuit 14c is transferred through an insulating circuit serving as an insulating path.

The insulating fly-back DC/DC converter reduces a voltage across both ends of first power storage module M1 to output a charge voltage. When a cell is connected to an output side of the insulating fly-back DC/DC converter, a charge current corresponding to a voltage of the cell flows. At this time, by controlling switch S10 by PWM, an amount of this charge current can be adjusted. In this manner, an output from the insulating fly-back DC/DC converter can be adjusted by adjusting a ratio of number of turns between the primary coil and the secondary coil of transformer T1 and a duty ratio of switch S10.

Various charge control methods may be adopted. A constant current/constant voltage (CC-CV) method is known as one of typical charge control methods. Any charge control method by which a subject cell is charged using a DC voltage supplied from the first power storage module M1 may be adopted, regardless of a configuration involved in the charge control method.

First sub-management unit 10 includes discharge switch S2 and discharge resistance R1 that are connected in series to make up a discharge circuit. Discharge switch S2 and discharge resistance R1, which are connected in series, are connected between both ends of first power storage module M1. Discharge resistance R1 is a resistance for causing first power storage module M1 to discharge electricity accumulated therein. Discharge switch S2 is connected between first power storage module M1 and discharge resistance R1. When in the on-state, discharge switch S2 allows first power storage module M1 to discharge electricity accumulated therein, to discharge resistance R1.

The discharge circuit is used to perform passive balancing between first power storage module M1 to third power storage module M3. Voltage detection circuit 13 controls switching on and off of discharge switch S2, based on a control signal for the equalization process, the control signal being transmitted from main management unit 50 to voltage detection circuit 13 via communication line 40.

Power supply selector switch S1 is connected between an output terminal of second power supply circuit 12 and a power supply input terminal of voltage detection circuit 13. When power supply selector switch S1 is in the on-state, voltage detection circuit 13 can be supplied with power from second power supply circuit 12. In this manner, voltage detection circuit 13 can be supplied with power selectively from both first power supply circuit 11 and second power supply circuit 12.

FIG. 1 is referred to again. Second sub-management unit 20 and third sub-management unit 30 each have the same configuration as that of first sub-management unit 10, and therefore will be omitted in further description. Each power storage block has at least one temperature sensor (e.g., thermistor) incorporated therein, the temperature sensor detecting temperatures of a plurality of cells included in each power storage module. The communication circuits (not depicted) of first sub-management unit 10 to third sub-management unit 30 each transmit temperature values of the plurality of cells as well as voltage values of the same, to main management unit 50.

First power storage module M1 to third power storage module M3 are connected in series to form one power storage unit. In the example of FIG. 1, power storage modules M1 to M3 each include 5 cells connected in series, thus forming a series circuit including 15 cells in total. It should be noted that when a high-voltage-driven motor is used, a number of cells connected in series is increased. For example, when a motor requiring a high voltage (e.g., about 400 V) is used, a series circuit including 100 cells in total may be formed. Typically, 8 or more power storage modules each including 5 to 20 cells connected in series are connected in series to form one storage unit.

This exemplary embodiment shows an example of the power storage module including 5 cells connected in series. It is preferable, however, that the number of cells included in the power storage module be determined according to a withstand voltage of the ASIC or the power supply circuit.

Main management unit 50 has a microcomputer and a non-volatile memory (e.g., electrically erasable programmable read-only memory (EEPROM), flash memory, or the like). The non-volatile memory contains a state of charge (SOC)-open circuit voltage (OCV) map. Main management unit 50 acquires voltage values and temperature values of the plurality of cells E1 to E15 from first sub-management unit 10 to third sub-management unit 30, via communication line 40. Main management unit 50 acquires also current values of currents flowing through the plurality of power storage modules M1 to M3, the currents being detected by a current detector not depicted.

Main management unit 50 estimates SOC values and SOH (state of health) values of the plurality of cells E1 to E15, based on voltage values, temperature values, and current values of the cells E1 to E15. An SOC value can be estimated by an OCV method or a current integration method. The OCV method is a method by which an SOC value is estimated based on an OCV value of a detected cell and on SOC-OCV curve characteristics data stored in the non-volatile memory. The current integration method is a method by which an SOC value is estimated based on an OCV value of a detected cell at the start of its charging/discharging and on an integrated value of a detected current.

An SOH value is defined by a ratio of a full-charge capacity at the present point to a full-charge capacity in an initial period. A lower SOH value (i.e., SOH value closer to 0%) indicates an aggravated state of deterioration. Deterioration of a secondary battery cell can be approximated by the sum of storage-dependent deterioration and cycle deterioration.

Storage-dependent deterioration of the secondary battery cell aggravates in the course of time passage, in which the deterioration advances depending on a temperature and an SOC value of the secondary battery cell at each point of time, regardless of whether it is being charged or discharging. The higher (the closer to 100%) the SOC value at each point of time is or the higher the temperature at each point of time is, the higher the storage-dependent deterioration speed becomes.

Cycle deterioration aggravates as a number of times of charging/discharging increases. Cycle deterioration depends on a service SOC range, a temperature, and a current rate. The wider the service SOC range is, the higher the temperature is, or the higher the current rate is, the higher the cycle deterioration speed becomes. In this manner, the deterioration of the secondary battery cell depends greatly on a service environment, and therefore variations in capacities of the plurality of cells E1 to E15 increase as a service period gets longer.

Main management unit 50 acquires respective voltage values of cells E1 to E15 from the plurality of voltage detection circuits 13, 23, 33 and executes the equalization process. Main management unit 50 performs active balancing between the plurality of cells E1 to E5, between the plurality of cells E6 to E10, and between the plurality of cells E11 to E15, the cells E1 to E5, E6 to E10, and E11 to E15 being included respectively in the plurality of power storage modules M1 to M3, using the plurality of active cell balancing circuits 14, 24, 34. Main management unit 50 performs also passive balancing between the plurality of power storage modules M1 to M3.

Active balancing performed between the plurality of cells E1 to E5 included in first power storage module M1 will hereinafter be described. Active balancing is performed with a first method by which a cell with a smallest capacity among the plurality of cells E1 to E5 is charged until the capacity of the cell reaches a capacity of a cell with a largest capacity. It should be noted that during this charging process, capacities of cells other than the cell being charged decrease. When the capacity of the cell being charged reaches the capacity of the cell with the largest capacity, charging this cell is ended. By repeating this process, the capacities of all cells can substantially be matched.

Main management unit 50 acquires or estimates OCV/SOC values of the plurality of cells E1 to E5, and identifies a cell with a lowest OCV/SOC value. Main management unit 50 transmits a control signal to switch control circuit 14c such that the identified cell is charged. In this manner, the cell with the lowest OCV/SOC value is charged until its OCV/SOC value reaches an OCV/SOC value of a cell with a highest OCV/SOC value. By repeating this process, main management unit 50 can substantially match the OCV/SOC values of the plurality of cells E1 to E5.

Active balancing is performed also with a second method according to which main management unit 50 divides OCV/SOC values of first power storage module M1 by the number of cells to calculate a target OCV/SOC value for the plurality of cells E1 to E5. If a value given by subtracting estimated loss, which is caused by charging by active cell balancing circuit 14, from the OCV/SOC values of first power storage module M1 is divided by the number of cells, a more precise target OCV/SOC value can be calculated.

Main management unit 50 charges cells with OCV/SOC values lower than the target OCV/SOC value in order until their OCV/SOC values reach the target OCV/SOC value. These cells may be charged in the order of lower OCV/SOC values or may be charged in arbitrarily decided order. Thus, main management unit 50 can substantially match the OCV/SOC values of the plurality of cells E1 to E5. It should be noted that as a target value for active balancing, an allowable charge amount/allowable discharge amount may be used in place of the OCV/SOC value.

The above-described active balancing is executed also at the other power storage modules M2 and M3. It should be noted that at a power storage module in which the OCV/SOC values of the plurality of cells are substantially the same, executing active balancing is unnecessary.

In the passive balancing, main management unit 50 acquires or estimates OCV/SOC values of the plurality of power storage modules M1 to M3 and identifies a power storage module with a lowest OCV/SOC value. To match OCV/SOC values of a plurality of other power storage modules to an OCV/SOC value of the storage module with the lowest OCV/SOC value, main management unit 50 determines respective discharge times for the other power storage modules. Main management unit 50 calculates a discharge capacity based on a difference between a current OCV/SOC value of each power storage module and an OCV/SOC value to be set as a target value in equalization. Main management unit 50 then determines each discharge time based on each discharge capacity calculated and on an amount of power consumption by the first power supply circuit and discharge resistance R1 of each power storage block. The larger the amount of power consumption by each power storage block is, the shorter the discharge time is.

Based on each discharge time determined, main management unit 50 controls switching on and off of respective discharge switches S2 of the plurality of the other power storage modules. In a power storage block in which discharge switch S2 is in the on-state, a current flows from the power storage module to discharge resistance R1, which reduces an OCV/SOC value of the power storage module. When respective OCV/SOC values of the plurality of power storage modules all match substantially, the passive balancing is ended. It should be noted that as a target value for the passive balancing, an allowable charge amount/allowable discharge amount may be used in place of the OCV/SOC value, as in the case of the active balancing.

The passive balancing between the plurality of power storage modules M1 to M3 may be executed after the active balancing between the plurality of cells E1 to E5, between the plurality of cells E6 to E10, and between the plurality of cells E11 to E15, the cells E1 to E5, E6 to E10, and E11 to E15 being included the power storage modules M1 to M3, respectively, is completed, or the above passive balancing and active balancing may be executed simultaneously.

Because the above active balancing is energy transfer between cells in each power storage module, a voltage across both ends of each power storage module, basically, does not change during execution of the active balancing. Strictly speaking, however, the voltage drops to an extent equivalent to loss caused by active balancing circuit 14.

When the second method of active balancing is carried out, main management unit 50 can determines a target value for the passive balancing between the plurality of power storage modules M1 to M3 at the point of start of the active balancing. The active balancing is executed at a power storage block that requires the active balancing, while the passive balancing is executed at a power storage block that does not require the active balancing. When the active balancing ends at a power storage block where the active balancing is being executed, the passive balancing then starts at the power storage block.

The active balancing is a process intended for keeping loss caused by cell balancing as small as possible. It is required, therefore, that the power storage module consumes as less power as possible during execution of the active balancing. The passive balancing is, on the other hand, a process of equalizing the OCV/SOC values of the plurality of power storage modules M1 to M3 through discharge. More power consumption by the power storage module, therefore, leads to an earlier end of the passive balancing.

According to this embodiment, main management unit 50 transmits a control signal for operating both the first power supply circuit and the second power supply circuit and switching off power supply selector switch S1, to the sub-management unit of a power storage block being undergoing the passive balancing. As a result, in the power storage block being undergoing the passive balancing, the first power supply circuit supplies power to the voltage detection circuit and the second power supply circuit supplies power to the active cell balancing circuit. This increases power consumption by the power storage module because the first power supply circuit is a power supply circuit with low efficiency. Hence the OCV/SOC value of the power storage module is reduced quickly.

Particularly, in a case where the number of cells included in the power storage module is large, power consumption by the power storage module increases. For example, when a voltage across both ends of the power storage module is about 80 V and a power supply voltage of the voltage detection circuit is about 5 V, 15/16 of power output from the power storage module to the first power supply circuit is turned into heat.

Main management unit 50, in contrast, transmits a control signal for stopping the first power supply circuit, operating the second power supply circuit, and switching on power supply selector switch S1, to the sub-management unit of a power storage block being undergoing the active balancing. As a result, in the power storage block being undergoing the active balancing, the second power supply circuit supplies power to the voltage detection circuit and to the active cell balancing circuit as well. This decreases power consumption by the power storage module because the second power supply circuit is a power supply circuit with high efficiency.

Figure 3:
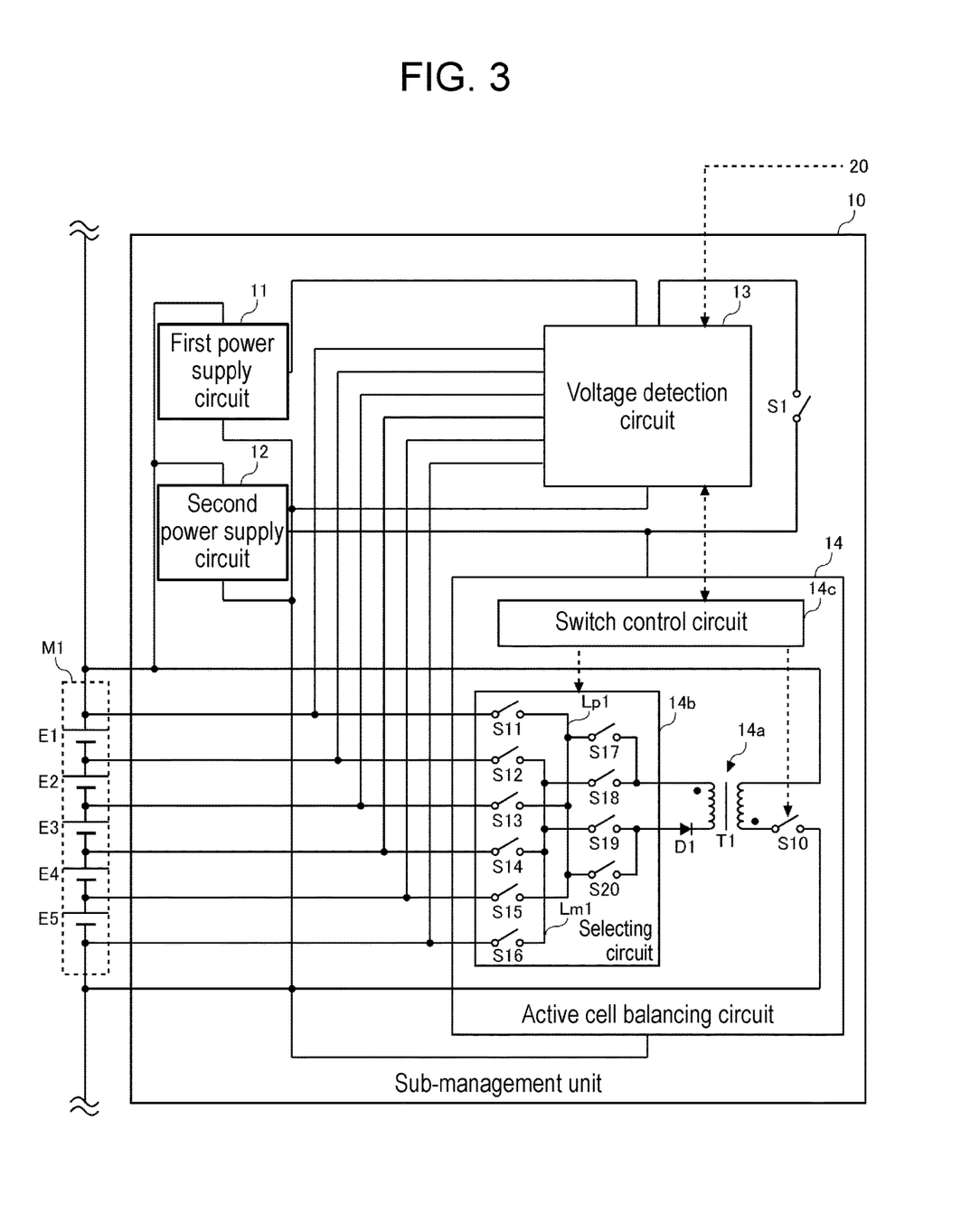
FIG. 3 is a diagram showing a second configuration example of the first sub-management unit.

FIG. 3 is a diagram showing a second configuration example of first sub-management unit 10. Comparing the second configuration example with the first configuration example shown in FIG. 2 reveals that discharge switch S2 and discharge resistance R1 are omitted from the second configuration example. When power consumption by first power supply circuit 11 is considered to be a sufficient discharge load in the passive balancing, discharge switch S2 and discharge resistance R1 can be omitted from first sub-management unit 10. Using application software allowing a longer discharge time facilitates adoption of the second configuration example. It should be noted that because the discharge load is greater in the first configuration example than in the second configuration example, the discharge time is made shorter in the first configuration example than in the second configuration example.

Figure 4:
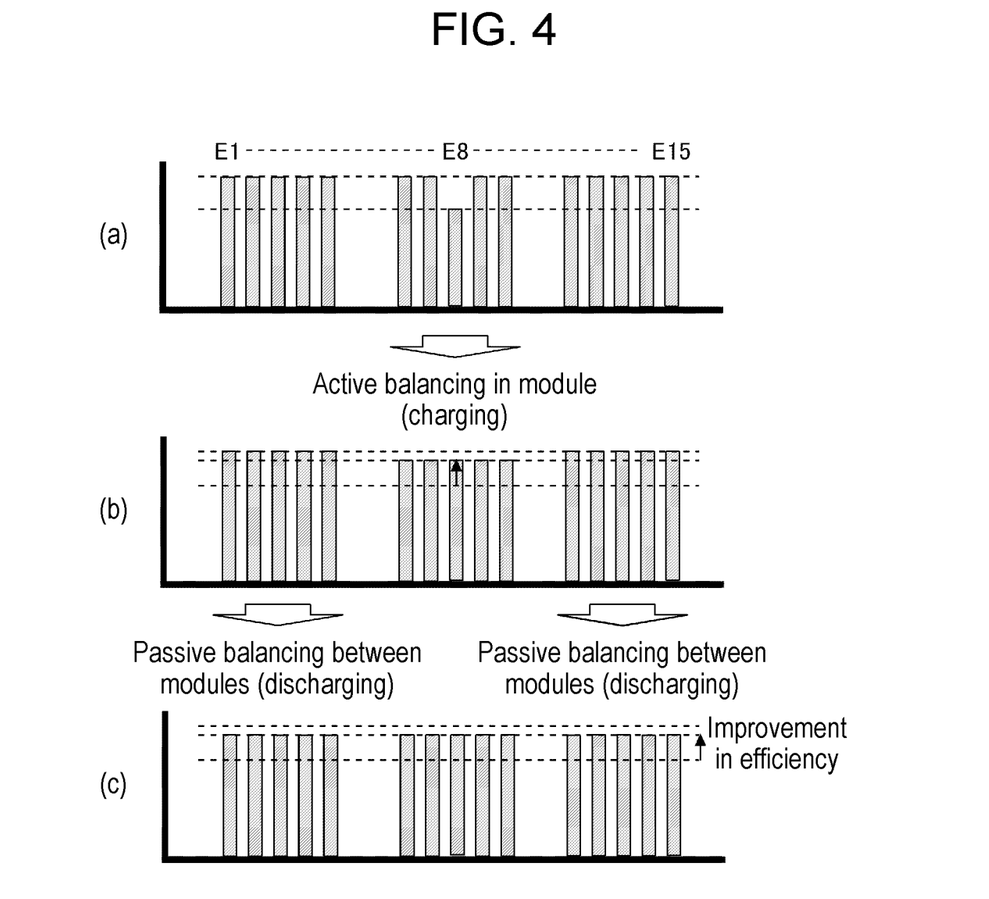
FIGS. 4(a) to 4(c) are diagrams showing an example of an equalization process executed in the power supply system according to the exemplary embodiment of the present invention.

FIGS. 4(*a*) to (*c*) are diagrams showing an example of the equalization process executed in power supply system 1 according to the exemplary embodiment of the present invention. FIG. 4(*a*) is a diagram showing a state of capacities of cells E1 to E15 before execution of the equalization process. FIG. 4(*a*) depicts a state in which a capacity of eighth cell E8 has dropped. Time-dependent deterioration, variations in individual cells, or the like may lead to a case where a cell with a larger self-discharge amount arises. Eighth cell E8 is a cell whose self-discharge amount is larger than self-discharge amounts of the other cells E1 to E7 and E9 to E15. Main management unit 50 executes the active balancing between the plurality of cells E6 to E10 included in second power storage module M2.

FIG. 4(*b*) is a diagram showing a state of capacities of cells E1 to E15 after the end of the active balancing between the plurality of cells E6 to E10 included in second power storage module M2. Since the active balancing is executed within second power storage module M2, capacities of other cells E6, E7, E9, and E10 in second power storage module M2 drop as eighth cell E8 is charged.

Main management unit 50 executes the passive balancing between first power storage module M1 to third power storage module M3. Specifically, main management unit 50 instructs voltage detection circuit 13 of first power storage module M1 and voltage detection circuit 33 of third power storage module M3 to cause a discharge process by which respective capacities of first power storage module M1 and third power storage module M3 are brought into equal to a capacity of second power storage module M2.

FIG. 4(*c*) is a diagram showing a state of capacities of cells E1 to E15 after the end of the passive balancing between first power storage module M1 to third power storage module M3. FIG. 4(*c*) depicts a state in which all capacities of cells E1 to E15 are substantially equal to each other. When the equalization process on cells E1 to E15 is executed by performing ordinary passive balancing only, capacities of other cells E1 to E7 and E9 to E15 must be brought into equal to a capacity of eighth cell E8 shown in FIG. 4(*a*) through the discharge process. Such an equalization process is lower in efficiency than the equalization process according to this exemplary embodiment.

Figure 5:
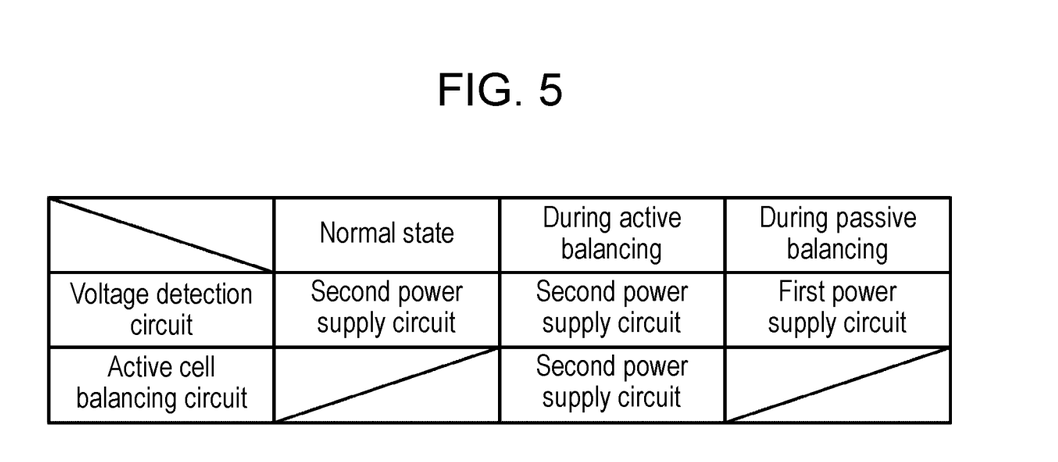
FIG. 5 is a table in which power supply circuits serving as power supplies are listed for respective states of a voltage detection circuit and an active cell balancing circuit.

FIG. 5 is a table in which the power supply circuits serving as power supplies are listed for respective states of the voltage detection circuit and the active cell balancing circuit. In an ordinary state where no equalization process is performed, the voltage detection circuit is supplied with power from the second power supply circuit. In the ordinary state, increasing power consumption by the power storage module is unnecessary, and therefore the voltage detection circuit being supplied with power not from the first power supply circuit but from the second power supply circuit allows the power storage block as a whole to keep unnecessary power consumption low. In the ordinary state, the active cell balancing circuit does not need to operate and is therefore left stopped.

During execution of the active balancing, the voltage detection circuit is supplied with power from the second power supply circuit, as in the ordinary state. During execution of the active balancing, increasing power consumption by the power storage module is unnecessary as in the ordinary state, and therefore the voltage detection circuit being supplied power not from first power supply circuit but from second power supply circuit allows the power storage block as a whole to keep unnecessary power consumption low. The active cell balancing circuit is supplied with power from the second power supply circuit.

During execution of the passive balancing, the voltage detection circuit is supplied with power from the first power supply circuit. This increases power consumption by the power storage module, thus causing the power storage module to reduce its capacity quickly. The active cell balancing circuit is stopped during execution of the passive balancing.

As descried above, according to this exemplary embodiment, the active balancing between the plurality of cells in each power storage module is executed and the passive balancing between the plurality of power storage modules is executed as well. This improves power efficiency while suppressing complication of a component structure.

During execution of the passive balancing, the voltage detection circuit is supplied with power from the first power supply circuit that makes power consumption large. In other states where the passive balancing is not executed, the voltage detection circuit is supplied with power from the second power supply circuit that makes power consumption small. This allows the passive balancing to be completed quickly and improves power efficiency in a period in which the passive balancing is not executed.

Adopting the second configuration example shown in FIG. 3 allows dispensing with discharge resistance R1 and discharge switch S2, thus allowing a reduction in a circuit area and cost.

The present invention has been described above according to the exemplary embodiment. It will be understood by those who are skilled in the art that the exemplary embodiment is merely an example, that various modifications of combinations of components and/or processes of the exemplary embodiment are possible, and that such modifications still fall within the scope of the present invention.

In the above exemplary embodiment, an example in which one voltage detection circuit is provided for one power storage module has been described. It is possible, however, to adopt a configuration in which a plurality of voltage detection circuits are provided for one power storage module. It is possible, for example, to adopt a configuration in which 2 voltage detection circuits are provided for a power storage module including 20 cells connected in series and each of the voltage detection circuits detects respective voltages of 10 cells. In such a case, the active cell balancing is executed on each group of cells (10 cells in this case) put under management by one voltage detection circuit. In this case, two active balancing processes independent of each other are executed in one power storage block.

The first configuration example shown in FIG. 2 is described as an example in which each power storage block is provided with one discharge resistance. A number of discharge resistances is, however, not limited to one, which means that a configuration in which a discharge resistance is provided for each cell is not excluded from configurations to adopt.

The exemplary embodiment may be specified by the following items of descriptions.

[Item 1]

Power supply system (1) including:
a plurality of series cell groups (M1 to M3) connected in series, series cell groups (M1 to M3) each including a plurality of cells (E1 to E5, E6 to E10, E11 to E15) connected in series;
a plurality of voltage detection circuits (13, 23, 33) connected respectively to the plurality of series cell groups (M1 to M3), each of voltage detection circuits (13, 23, 33) detecting a voltage of each of a plurality of cells (E1 to E5, E6 to E10, E11 to E15) included in subject series cell group (M1 to M3);
a plurality of first power supply circuits (11, 21, 31) connected respectively to the plurality of series cell groups (M1 to M3), each of first power supply circuits (11, 21, 31) reducing a voltage across both ends of a subject series cell group (M1 to M3) and supplying power to subject voltage detection circuit (13, 23, 33);
a plurality of active cell balancing circuits (14, 24, 34) connected respectively to the plurality of series cell groups (M1 to M3), active cell balancing circuits (14, 24, 34) each being configured to selectively charge any one of the plurality of cells (E1 to E5, E6 to E10, E11 to E15) included in subject series cell group (M1 to M3), using a voltage across both ends of subject series cell group (M1 to M3);
a plurality of second power supply circuits (12, 22, 32) connected respectively to the plurality of series cell groups (M1 to M3), each of second power supply circuits (12, 22, 32) reducing a voltage across both ends of subject series cell group (M1 to M3) and supplying power to subject active cell balancing circuit (14, 24, 34); and
control circuit (50) that acquires each of voltage values of cells (E1 to E5, E6 to E10, E11 to E15) from the plurality of voltage detection circuits (13, 23, 33), control circuit (50) performing active balancing between a plurality of cells (E1 to E5, E6 to E10, E11 to E15) included in each of the plurality of series cell groups (M1 to M3), using the plurality of active cell balancing circuits (14, 24, 34), and performing passive balancing between the plurality of series cell groups (M1 to M3), wherein second power supply circuit (12, 22, 32) is a power supply circuit higher in efficiency than first power supply circuit (11, 21, 31) and is capable of supplying power also to each of voltage detection circuits (13, 23, 33),
voltage detection circuit (13, 23, 33) connected to a series cell group being undergoing the passive balancing and consuming power is supplied with power from first power second circuit (11, 21, 31), and
voltage detection circuit (13, 23, 33) connected to series cell group (M1 to M3) being undergoing the active cell balancing by active cell balancing circuit (14, 24, 34) is supplied with power from second power supply circuit (12, 22, 32).

According to this power supply system (1), an equalization process of improving power efficiency while suppressing complication of a component structure can be achieved. In addition, a time required for the passive balancing can be shortened and power efficiency during the active balancing can be improved.

[Item 2]

Power supply system (1) according to item 1, wherein
first power supply circuit (11, 21, 31) is a linear DC/DC converter, and
second power supply circuit (12, 22, 32) is a switching-type DC/DC converter.

According to this power supply system (1), during the passive balancing, power consumption by power storage module (M1 to M3) is increased to shorten a time required for the passive balancing, and, during the active balancing, power consumption by power storage module (M1-M3) can be kept low.

[Item 3]

Power supply system (1) according to item 1 or 2, further including a plurality of discharge circuits (R1, S2) connected respectively to the plurality of series cell groups (M1 to M3), each of discharge circuits (R1, S2) being configured to discharge electricity accumulated in subject series cell group (M1 to M3),
control circuit (50) performs the passive balancing between the plurality of series cell groups (M1 to M3), using the plurality of discharge circuits (R1, S2).

According to this power supply system (1), a discharge load can be increased to shorten a time required for the passive balancing.

[Item 4]

Power supply system (1) according to item 3, wherein discharge circuit (R1, S2) includes:
one resistance (R1) configured to discharge electricity accumulated in series cell group (M1); and switch (S2) connected between series cell group (M1) and resistance (R1).

According to this power supply system (1), a number of resistances and switches for discharging can be reduced.

[Item 5]

Power supply system (1) according to any one of item 1 to item 4, wherein
voltage detection circuit (13, 23, 33) connected to series cell group (M1 to M3) not in a state of being undergoing the passive balancing and consuming power is supplied with power from second power supply circuit (12, 22, 32).

According to this power supply system (1), a time required for the passive balancing can be shortened, and power efficiency in a period in which no passive balancing is performed can be improved.

[Item 6]

Management device (10 to 30, 50) that manages a plurality of series cell groups (M1 to M3) connected in series, series cell groups (M1 to M3) each including a plurality of cells (E1 to E5, E6 to E10, E11 to E15) connected in series, management device (10 to 30, 50) including: a plurality of voltage detection circuits (13, 23, 33) connected respectively to the plurality of series cell groups (M1 to M3), voltage detection circuits (13, 23, 33) each detecting a voltage of each of a plurality of cells (E1 to E5, E6 to E10, E11 to E15) included in subject series cell group (M1 to M3); a plurality of first power supply circuits (11, 21, 31) connected respectively to the plurality of series cell groups (M1 to M3), each of first power supply circuits (11, 21, 31) reducing a voltage across both ends of subject series cell group (M1 to M3) and supplying power to subject voltage detection circuit (13, 23, 33); a plurality of active cell balancing circuits (14, 24, 34) connected respectively to the plurality of series cell groups (M1 to M3), active cell balancing circuits (14, 24, 34) each being configured to selectively charge any one of the plurality of cells (E1 to E5, E6 to E10, E11 to E15) included in subject series cell group (M1 to M3), using a voltage across both ends of subject series cell group (M1 to M3); a plurality of second power supply circuits (12, 22, 32) connected respectively to the plurality of series cell groups (M1 to M3), each of second power supply circuits (12, 22, 32) reducing a voltage across both ends of subject series cell group (M1 to M3) and supplying power to subject active cell balancing circuit (14, 24, 34); and control circuit (50) that acquires each of voltage values of cells (E1 to E5, E6 to E10, E11 to E15) from the plurality of voltage detection circuits (13, 23, 33), control circuit (50) performing active balancing between the plurality of cells (E1 to E5, E6 to E10, E11 to E15) included in each of the plurality of series cell groups (M1 to M3), using the plurality of active cell balancing circuits (14, 24, 34), and performing passive balancing between the plurality of series cell groups (M1 to M3), wherein
second power supply circuit (12, 22, 32) is a power supply circuit higher in efficiency than first power supply circuit 11, 21, 31) and is capable of supplying power also to each of voltage detection circuits (13, 23, 33), voltage detection circuit (13, 23, 33) connected to series cell group (M1 to M3) being undergoing the passive balancing and consuming power is supplied with power from first power supply circuit (11, 21, 31), and
voltage detection circuit (13, 23, 33) connected to series cell group (M1 to M3) being undergoing active cell balancing by active cell balancing circuit (14, 24, 34) is supplied with power from second power supply circuit (12, 22, 32).

According to this power supply system (1), an equalization process of improving power efficiency while suppressing complication of a component structure can be achieved. In addition, a time required for the passive balancing can be shortened and power efficiency during the active balancing can be improved.

REFERENCE MARKS IN THE DRAWINGS 1 power supply system
M1-M3 power storage module
10 first sub-management unit
20 second sub-management unit
30 third sub-management unit
40 communication line
50 main management unit
E1-E15 cell
11, 21, 31 first power supply circuit
12, 22, 32 second power supply circuit
13, 23, 33 voltage detection circuit
14, 24, 34 active cell balancing circuit
14a DC/DC converter
14b cell selecting circuit
14c switch control circuit
R1 discharge resistance
S1 power supply selector switch
S2 discharge switch
T1 transformer
D1 diode
S10-S20 switch

The invention claimed is:

1. A power supply system comprising:
a plurality of series cell groups connected in series, the plurality of series cell groups each including a plurality of cells connected in series;
a plurality of voltage detection circuits connected respectively to the plurality of series cell groups, the plurality of voltage detection circuits each detecting a voltage of each of the plurality of cells included in a subject series cell group;
a plurality of first power supply circuits connected respectively to the plurality of series cell groups, each of the plurality of first power supply circuits reducing a voltage across both ends of the subject series cell group and supplying power to a subject voltage detection circuit;
a plurality of active cell balancing circuits connected respectively to the plurality of series cell groups, the plurality of active cell balancing circuits each being configured to selectively charge any one of the plurality of cells included in the subject series cell group, using a voltage across both ends of the subject series cell group;
a plurality of second power supply circuits connected respectively to the plurality of series cell groups, each of the plurality of second power supply circuits reducing a voltage across both ends of the subject series cell group and supplying power to a subject active cell balancing circuit; and
a control circuit that acquires each of voltage values of the cells from the plurality of voltage detection circuits, the control circuit performing active balancing between the plurality of cells included in each of the plurality of series cell groups, using the plurality of active cell balancing circuits, and performing passive balancing between the plurality of series cell groups,
wherein
the plurality of second power supply circuits are power supply circuits higher in efficiency than the plurality of first power supply circuits and are configured to supply power also to each of the plurality of voltage detection circuits,
a voltage detection circuit among the plurality of voltage detection circuits, connected to a respective one of the plurality of series cell groups being undergoing the passive balancing and consuming power is supplied with power from a respective one of the plurality of first power supply circuits, and
a voltage detection circuit among the plurality of voltage detection circuits, connected to a respective one of the plurality of series cell groups being undergoing active cell balancing by a respective one of the plurality of active cell balancing circuits is supplied with power from a respective one of the plurality of second power supply circuits.

2. The power supply system according to claim 1, wherein the plurality of first power supply circuits are linear direct current to direct current converters, and
the plurality of second power supply circuits are switching-type direct current to direct current converters.

3. The power supply system according to claim 1, further comprising a plurality of discharge circuits connected respectively to the plurality of series cell groups, each of the discharge circuits being configured to discharge electricity accumulated in the subject series cell group,
wherein the control circuit performs passive balancing between the plurality of series cell groups, using the plurality of discharge circuits.

4. The power supply system according to claim 3, wherein one of the plurality of discharge circuits include:
one resistance configured to discharge electricity accumulated in one of the plurality of series cell groups; and
a switch connected between the one of the series cell groups and the one resistance.

5. The power supply system according to claim 1, wherein a voltage detection circuit among the plurality of voltage detection circuits connected to a respective one of the plurality of series cell groups not in a state of undergoing the passive balancing and consuming power is supplied with power from a respective one of the plurality of second power supply circuits.

6. A management device that manages a plurality of series cell groups connected in series, the plurality of series cell groups each including a plurality of cells connected in series, the management device comprising:
a plurality of voltage detection circuits connected respectively to the plurality of series cell groups, the plurality of voltage detection circuits each detecting a voltage of each of the plurality of cells included in a subject series cell group;
a plurality of first power supply circuits connected respectively to the plurality of series cell groups, each of the plurality of first power supply circuits reducing a voltage across both ends of the subject series cell group and supplying power to a subject voltage detection circuit;
a plurality of active cell balancing circuits connected respectively to the plurality of series cell groups, the plurality of active cell balancing circuits each being configured to selectively charge any one of the plurality of cells included in the subject series cell group, using a voltage across both ends of the subject series cell group;
a plurality of second power supply circuits connected respectively to the plurality of series cell groups, each of the plurality of second power supply circuits reducing a voltage across both ends of the subject series cell group and supplying power to a subject active cell balancing circuit; and
a control circuit that acquires each of voltage values of the cells from the plurality of voltage detection circuits, the control circuit performing active balancing between the plurality of cells included in each of the plurality of series cell groups, using the plurality of active cell balancing circuits, and performing passive balancing between the plurality of series cell groups,
wherein
the plurality of second power supply circuits are power supply circuits higher in efficiency than the plurality of first power supply circuits and are configured to supply power also to each of the plurality of voltage detection circuits,
a voltage detection circuit among the plurality of voltage detection circuits, connected to a respective one of the plurality of series cell groups being undergoing the passive balancing and consuming power is supplied with power from a respective one of the plurality of first power supply circuits, and
a voltage detection circuit among the plurality of voltage detection circuits, connected to a respective one of the plurality of series cell groups being undergoing active cell balancing by a respective one of the plurality of active cell balancing circuits is supplied with power from a respective one of plurality of the second power supply circuits.

* * * * *